United States Patent [19]

Diamond

[11] 4,234,108
[45] Nov. 18, 1980

[54] PISTON FOR AEROSOL CONTAINER

[76] Inventor: George B. Diamond, Anthony & Woodglen Rds., R.D., Glen Gardner, N.J. 08826

[21] Appl. No.: 854,487
[22] Filed: Nov. 25, 1977
[51] Int. Cl.$^3$ .............................................. B67D 5/54
[52] U.S. Cl. ..................................... 222/386; 92/240; 222/389
[58] Field of Search ...................... 222/386, 386.5, 387, 222/389, 402.22, 326, 327; 92/182, 212, 240; 239/322, 323; 128/218 P, 220; 417/392; 184/37

[56] References Cited

U.S. PATENT DOCUMENTS

| 2,371,332 | 3/1945 | Jacobson | 222/386 |
| 3,273,762 | 9/1966 | O'Neill | 222/389 |
| 3,275,200 | 9/1966 | Livingstone | 222/389 |
| 3,381,863 | 5/1968 | Towns | 222/389 X |
| 3,870,200 | 3/1975 | Spatz | 222/386 X |
| 3,901,416 | 8/1975 | Schultz | 222/389 |
| 3,987,941 | 10/1976 | Blessing | 222/386 |

FOREIGN PATENT DOCUMENTS 543791 1/1956 Belgium ....................................... 92/212
2254513 11/1972 Fed. Rep. of Germany ........... 222/386

Primary Examiner—Robert J. Spar
Assistant Examiner—Fred A. Silverberg
Attorney, Agent, or Firm—Ostrolenk, Faber, Gerb & Soffen

[57] ABSTRACT

A piston for an aerosol container, particularly adapted for insertion through the top of the container; the piston includes an annular, cylindrical collar near its top end and a conical outwardly flaring flange atop the cylindrical collar, with the flange flaring wider toward the top of the container, whereby the flange scrapes the container interior as it moves up; the cylindrical collar is more flexible than the conical flange to ease insertion of the piston and for more effective piston sealing despite the piston cocking in the container; an anti-cocking ring are provided on the piston.

19 Claims, 5 Drawing Figures

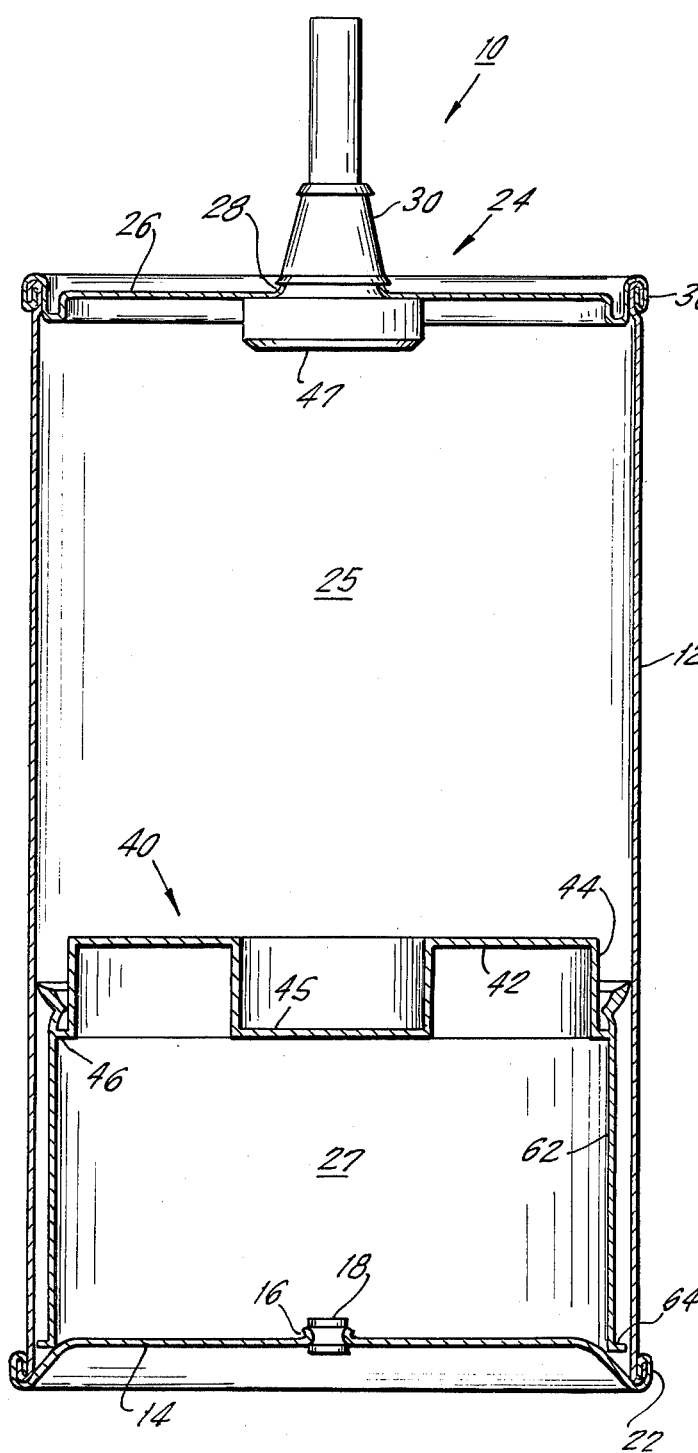
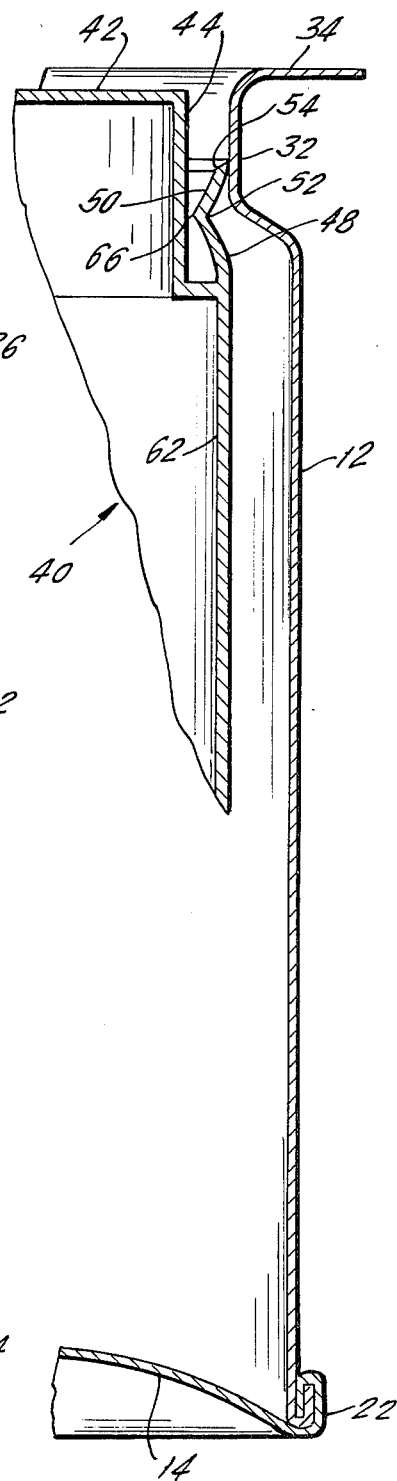

PISTON FOR AEROSOL CONTAINER

BACKGROUND OF THE INVENTION

Aerosol containers are used for dispensing many different fluent products, from products of very low viscosity to products of very high viscosity. One type of aerosol container is a piston container on a barrier pack, comprising a container having a piston dividing it between a chamber on the outlet nozzle side of the container in which chamber the fluent product to be dispensed is located and a chamber for containing a gaseous propellant on the other side of the piston. The propellant continuously urges the piston toward the nozzle for dispensing the fluent material from the aerosol container when the valve in the nozzle is opened.

Depending upon various factors, the pressure exerted by the propellant on the fluent material can vary, between an aerosol container that is fully charged and one that is nearly fully discharged, and between a high pressure container and a low pressure container, with a container pressure anywhere between 6 psig. through about 150 psig. The material of which the container is comprised can vary from soft cardboard, through thin plastic, thick plastic, thin metal, up to heavy weight metal, with the choice of material being dependent in part upon the maximum pressure in the fully charged aerosol container.

The walls of an aerosol container are often slightly dented, nicked or otherwise deformed during manufacture, shipping, storage, delivery and/or use. A higher pressure container will at least partially restore itself to its original shape due to the internal pressure therein. But, a low pressure container and/or one made of inflexible or non-resilient material may not restore itself and may retain its deformed condition. The walls of a soft walled container can be easily restored to their original shape. But, the walls of a harder walled container usually retain any dents or deformations.

It is desirable for the piston in any aerosol container to maintain a continuous annular seal with the interior wall of the container as it moves through the container toward the nozzle. When the container wall has no significant dents or deformations, maintenance of this seal is easy. However, when the container wall does have dents and deformations, as the piston passes by these, the seal of the piston may be broken. With a soft walled container, it is beneficial if the annular periphery of the piston, which engages the internal side walls of the container, is sufficiently rigid to restore the container wall to its original undeformed shape as the piston passes by. This helps maintain the seal. In the case of hard walled containers whose walls are deformed or in the case of those deformations in a soft walled container which cannot be easily straightened out as the piston moves by, it is desirable for the piston to have sufficient flexibility to itself deform to conform in shape to the deformation in the container as it passes the deformation. At the same time, the piston should have sufficient elasticity and resilience to restore itself to the interior profile of the container walls once the piston has passed the deformation, thereby to maintain the continuous seal.

Most aerosol container barrier pistons are loaded through the bottom of the container, which is the end opposite the outlet nozzle. However, certain containers, and in particular soft walled containers and also extruded cans, are initially formed with their bottom in place, and the barrier piston is installed through the top of the closed bottom container. It is desirable, therefore, for the piston to be capable of being received through the open top of the container. Furthermore, the rim portion of the open top of an aerosol container is often slightly narrower in diameter, as compared with the diameter of the remainder of the container interior wall. The piston should be so designed that it can be inserted through the narrowed top rim portion of the container and yet still maintain a seal with the entire length of the interior wall of the container.

Furthermore, as the barrier piston moves through the aerosol container, during expulsion of fluent material, the piston sometimes cocks and does not always maintain an orientation at which its axis is aligned with the axis of the container. Pistons typically have an anticocking means which prevents them from tilting or cocking through too great an angle. But, a certain minimum degree of cocking is almost unavoidable, and a piston should be adapted to maintain a secure seal, even though the piston has cocked slightly.

Finally, as a piston moves up through the aerosol container toward the outlet, all of the contents of the container above the piston should be forced out of the valve in the outlet nozzle. None of the contents should be able to slip down past the side of the piston and none should adhere to the container wall as the piston goes by. However, a very effective seal for preventing bypass of the contents of the container may undesirably hinder movement of the piston through the container. Thus, it is desirable to provide some means on the piston for minimizing or eliminating the passage of any of the contents of the container past the piston while still permitting the piston to move through the container.

SUMMARY OF THE INVENTION

The piston according to the invention is adapted for use as the barrier piston in an aerosol container. This piston can be used over the whole range of operating pressures over which aerosol containers are usually operated, e.g. from 6 psig through about 150 psig, and over the whole range of aerosol container side wall stiffnesses that are normally encountered. See, for example, U.S. Application Ser. No. 693,768, filed June 8, 1976, now abandoned in favor of continuation application Ser. No. 877,979, filed Feb. 15, 1979. The piston is particularly adapted to maintain a secure seal with the interior walls of the aerosol container and to either straighten out dents or other deformations in the walls of soft walled containers or to itself temporarily deform to accommodate for the dents and deformations in a stiffer walled container which the piston is not stiff enough to return to its original shape.

The piston according to the invention comprises an annular support having a somewhat smaller exterior diameter than the interior diameter of the narrowest part of the container through which the piston must move. In the preferred embodiment, the piston is inserted through the top or outlet nozzle end of the aerosol container before the outlet nozzle is attached to the container. The top end of the container is slightly narrowed in diameter as compared with the remainder of the container. Therefore, the annular support of the piston is narrower still than the narrowed portion of the container, thereby to enable the piston to pass.

Secured on the annular support of the piston and extending upwardly from the support toward the top of the container when the piston is inserted, is a somewhat flexible and resilient supporting collar. In the preferred version, the collar is cylindrical, as this shape aids in radial flexing of the collar. The collar is thin enough to be able to flex, yet thick enough, strong enough and resilient enough to restore itself to its original cylindrical shape when any force seeking to deform the collar is removed.

Affixed at an annular junction to the free top end of the collar is an annular flange which is frusto-conical in shape and which flares outwardly toward the interior wall of the container from its junction with the collar. The free, outwardly flared annular end of the flange has a peripheral corner edge with an outer diameter that is slightly greater than the interior diameter of the interior side walls of the aerosol container, so that the flange peripheral corner edge is always in secure, sealing engagement with the interior walls of the container.

The piston is inserted in the container so that the flange flares outwardly upwardly in the container. The peripheral corner edge of the flange engages the interior wall of the container and scrapingly rubs therealong as the piston moves up through the container upon discharge of fluent material through the nozzle. Scraping engagement of this type is shown in U.S. Pat. No. 3,275,200. The normal urging of the scraping peripheral edge of the flange against the interior wall of the container, coupled with the fact that the peripheral edge is the leading edge of the piston in contact with the interior wall as the piston moves through the container, at least minimizes, if it does not completely eliminate, by-pass of any of the fluent material past the piston.

The flaring flange is also a resilient element, but it is less flexible than the collar beneath it. Thus, it is the collar that undergoes most of the deformation to conform to irregularities in the interior profile of the container, to accommodate slight cocking of the piston, etc. The flange is less likely to flex, first because it is usually somewhat thicker and thus less flexible than the supporting collar beneath it, and secondly because the frusto-conical shape of the flange inherently stiffens it. The greater stiffness of the flange, as compared with that of the collar, ensures a more effective seal.

The piston also has a piston head which closes the upper end of the piston, and the piston head is joined to the annular support on the piston for the collar. The piston head of a typical piston projects upwardly in the aerosol container toward the nozzle and also projects up from the annular support past both the collar and the flange. The upwardly projecting central section of the piston head is narrowed in diameter, as compared with the collar and the flange wrapped around it, and the central section of the piston head is so narrowed that even when the flange and collar are squeezed radially inwardly due to the bypassage of the collar and flange through the narrowed inlet opening of the container, the "heel" at the junction between the collar and the flange does not contact the central section of the piston head.

Cocking of the piston may move the container wall engaging corner edge of the flange of the piston out of contact with the container wall on that side of the piston that tilts away from the interior wall of the container. Even if this extreme situation does not develop, the cocking of the piston causes the container wall engaging flange to change from a generally circular shape to a more elliptical shape, and this misshapenness damages the seal between the piston and the interior wall of the container.

Anti-cocking means are provided for preventing the piston from excessive tilting in the container. In the preferred version, the anti-cocking means comprises an extension from the piston that extends downwardly in the container, and it is normally spaced from the interior wall of the container. In a preferred form, the anti-cocking means comprises an annular, depending skirt, and the extension or skirt has projections or a projecting ring around its base which projects toward the container interior wall and is spaced a short distance away from the wall. But, the anti-cocking means is placed such that when the piston cocks to a predetermined extent, the anti-cocking means engages the interior wall of the container and prevents the piston from cocking further.

The combination of the more rigid sealing flange atop the more flexible supporting collar gives the body of the piston freedom to cock slightly while the sealing flange itself actually does not begin cocking so that with minor cocking of the piston, the sealing flange may never cock at all. Thus, the arrangement of the invention permits the sealing flange to remain in its optimum sealing position.

The piston according to the invention is usable in a deformed or dented container which is of either the soft walled or the hard walled variety. In a hard walled container, the collar and flange will resiliently deflect and deform to maintain the seal between the flange and the container wall. In a soft walled container, the piston flange is rigid enough to restraighten the deformed container wall as the flange moves past and the flange also moves through the container with a good seal.

Accordingly, it is the primary object of the present invention to provide an improved barrier piston for an aerosol container.

It is another object of the invention to provide such a piston which can be used over a broad range of operating pressures in an aerosol container.

It is another object of the invention to provide such a piston which can be used over a broad range of stiffnesses for the side walls of the container.

It is a further object of the invention to provide such a piston which can be inserted through the top end of an aerosol container.

It is yet another object of the invention to provide such a piston which eliminates or at least minimizes the escape of the fluent material in the aerosol container past the piston.

It is yet another object of the invention to provide such a piston which is adapted to easily accommodate slight cocking of the piston without a reduction in the effectiveness of the seal of the piston.

It is another object of the invention to provide such a piston which is adapted to eliminate or reduce deformations in a more flexible walled container.

It is yet another object of the invention to provide such a piston which is adapted to maintain a seal as it passes deformations and dents in a stiffer walled container.

Other objects and features of the invention will become apparent from the following description of a preferred embodiment taken in conjunction with the accompanying drawings.

BRIEF DESCRIPTION OF THE DRAWINGS

FIG. 1 is an elevational view in cross section of one embodiment of an aerosol container which is provided with a piston according to the present invention;

FIG. 4 is an enlarged, fragmentary, cross sectional, side elevational view showing the piston as it is being inserted into the aerosol container.

DESCRIPTION OF A PREFERRED EMBODIMENT

Figure 2:
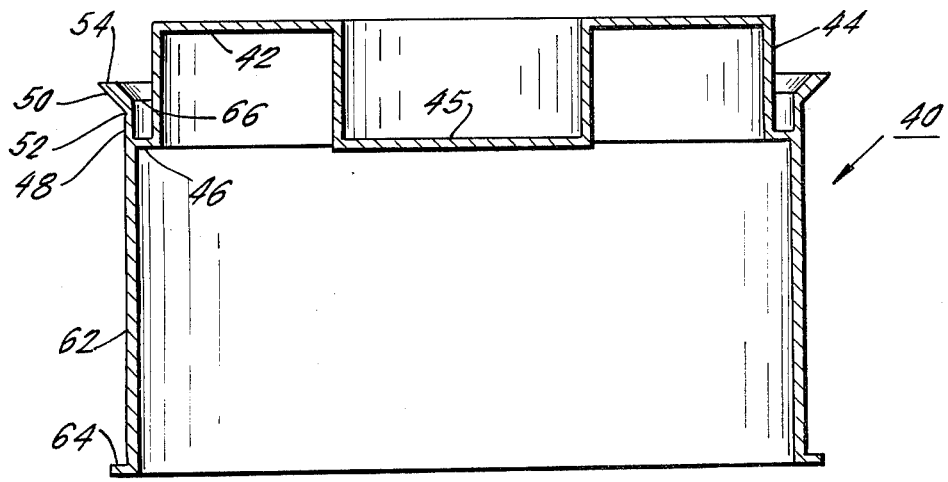
FIG. 2 is a side cross sectional view of the piston shown in FIG. 1 prior to insertion in the container and without deformation of the piston.

Referring to FIG. 1, the aerosol container 10 illustrated is comprised of the cylindrical side walls 12 of thin sheet metal, such as aluminum, which is sufficiently thin as to be easily deformable and dentable and also to be restorable to its original undeformed condition under the force exerted by the below described piston flange 50.

Although one type of material has been described for the side walls 12, it is to be understood that the piston according to the invention may be used with aerosol container side walls of varying thickness and deformation resistance, from quite flexible side walls, which can be reshaped and restored to their original profile by the piston as it passes by, up to stiff side walls which the piston is incapable of restoring to their original shape. The container may be metal, plastic and a soft container may even be formed of cardboard.

The container 10 includes a somewhat domed bottom wall 14. The doming strengthens the bottom wall against popping out under the pressure in the container. The bottom wall 14 has a filler opening 16 through which aerosol propellant is charged into the container 10 after the piston 40 and the fluent material being dispensed are emplaced in the container 10. A plug 18 seals the opening 16 against leakage. The side walls 12 of the container and the bottom wall 14 are folded together around their respective peripheries 22, forming an effective, tight seal. With extruded metal (or even plastic) containers (not shown), the side walls 12 and bottom wall 14 are initially integrally formed and are not later attached. The invention may be used with this type of container as well.

The container 10 also has an attached top 24. The top 24 is not installed until after the piston 40 has been inserted in the container 10 and the chamber 25 above the piston has been filled with the fluent material to be discharged from the container. The container top 24 includes the flat cover 26 having a central valve opening 28 therethrough.

Any conventional outlet nozzle and valve assembly may be emplaced in the valve opening 28. In the illustrated embodiment, a tilt valve 30 including a nozzle is emplaced in the valve opening 28 in the cover 26. The tilt valve may be of any conventional type or of the type described in U.S. Application Ser. No. 795,114, filed May 9, 1977, now U.S. Pat. No. 4,171,074, and further description of the tilt valve will not be provided herein.

With reference to FIG. 4, the upper end of the side walls 12 of the container are initially deformed inwardly to define the narrowed upper section 32 thereof. Above the narrowed upper section 32 is the radially outwardly projecting crimping flange 34. With reference to FIG. 1, the peripheral edge portion of the container cover 26 and the peripheral flange 34 of the container side walls 12 are folded together, as shown at 36, for securely holding and sealing the container cover 26 to the side walls 12.

The piston 40 according to the present invention includes the central closed piston head 42 which defines a sealed, impervious barrier. The piston head 42 has a central portion with an annular peripheral side wall 44 with an outer diameter that is, as shown in FIG. 4, somewhat smaller than the inner distance of the narrowed section 32 of the container side wall. As a result, the piston head can freely pass by the narrow upper entrance section 32 into the container 10. The top of the piston head is shaped so that it will nest under the underside of the cover 26 when the piston has ascended to the top of the container chamber 25 and has expelled all of the fluent material. The depression 45 at the center of the piston head receives the valve element 47 of the tilt vlave 30 on the underside of cover 26.

Around the periphery of the piston head 42 is the annular sealing supporting surface 46 which supports the below described collar.

Figure 5:
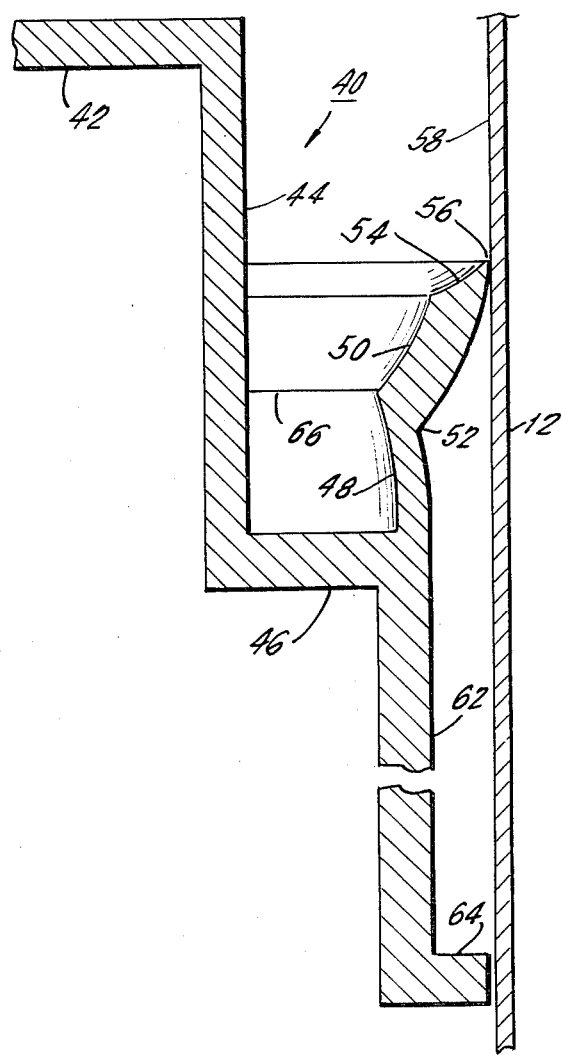
FIG. 5 is an enlarged, fragmentary, side elevational view in cross section of the piston in the container in the condition shown in FIG. 1.

Upstanding from the edge of the support surface 46 is an annular, sealing, cylindrical collar 48. As can be seen in FIGS. 1, 4 and 5, the outer diameter of the support surface 46 and the diameter of the collar 48 are slightly smaller than the interior diameter of the narrowed section 32 of the container side wall, whereby the collar 48 may be inserted past the container side wall narrowed section. The collar 48 is sufficiently thin and is comprised of sufficiently flexible material that the collar can be deformed radially inwardly from its cylindrical condition, as shown in FIGS. 1, 4 and 5, in order to support the flange 50 above the collar in secure sealing engagement with the interior wall of the container, in order to accommodate the deformities and dents in the interior walls of the container and in order to accommodate slight unpredictable but expected cocking of the piston as it moves through the container.

Figure 3:
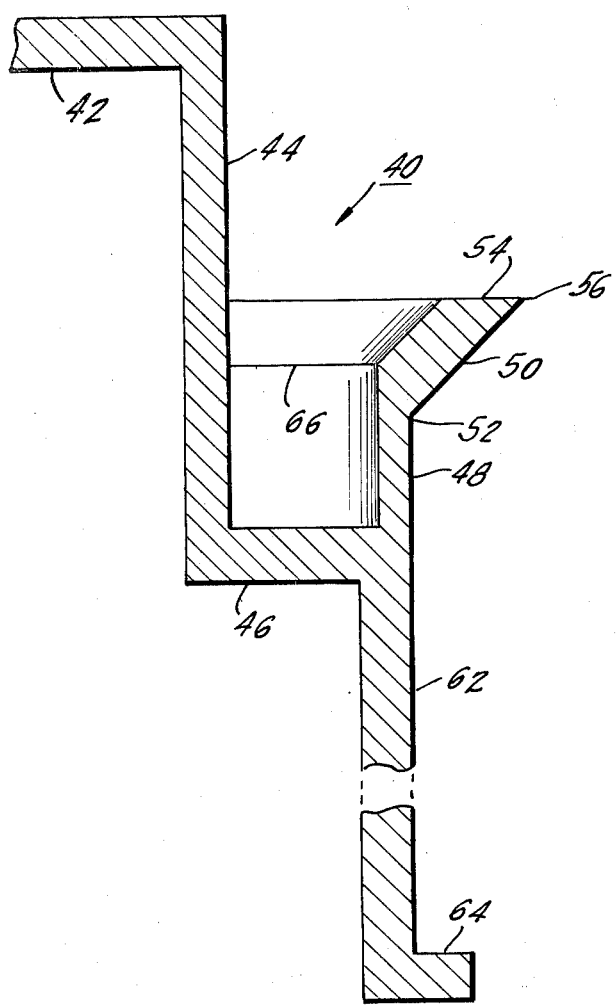
FIG. 3 is an enlarged, fragmentary view of the upper end portion of the piston of FIG. 2.

Atop the cylindrical collar 48 there is attached the frusto-conically shaped flange 50 which is sealingly joined to the collar at the annular junction 52 and "heel" 66 at the top end of the collar 48. The flange flares conically outwardly to its upper end 54. As shown in FIGS. 3 and 5, the flange 50 is also comprised of somewhat flexible, resilient material, and as a practical matter, the collar 48 and flange 50 are a continuous, integral unit comprised of the same material. However, the flange 50 is less flexible than the collar 48. When the collar and flange are an integral unit, the decreased flexibility of the flange is obtained by the flange being considerably thicker than the collar and being a less easily deformed frusto-conical shape.

The outer, peripheral, annular corner edge 56 of the upper end 54 of the flange 50 is a relatively sharp, almost knife edge which securely sealingly and scrapingly engages the interior wall 58 of the container side wall 12 as the piston 40 moves up through the container 10 upon discharge of fluent material through the outlet valve 30. The scraping corner edge 56 scrapingly rubs the interior wall 58 and wipes it clean of any fluent dispensed material that adheres to the wall as the piston moves up through the container, thereby ensuring complete discharge of the fluent material and preventing leakage of that material past the piston.

Although the flange 50 is designed so as not to be deformable to any significant extent in the container 12, the section of the flange near its corner edge 56 is considerably thinner than the remainder of the flange 50, leading up to the minimally thick corner edge 56. Thus, while the entire flange itself does not deform to any significant extent, the area nearer its corner edge 56 does, which provides good sealing and scraping engagement with the interior wall of the container 12.

For preventing cocking of the piston, the depending skirt or skirt means 62 depends beneath the support ring 46 and extends down through the container 10 to the annular anti-cocking ring 64. Although an annular skirt 62 is illustrated, the depending means may be discontinuous and segmented around the piston. Similarly, the element 64 thereon need not be continuous, so long as it is placed to contact the interior of the container side walls after the piston has cocked far enough.

The outer diameter of the annular anti-cocking ring 64 is slightly smaller than the interior diameter of the container 10 but is larger than the narrowed container section 32. To insert the piston 10 in the container, the ring 64 is squeezed past and is deformed by the narrowed container section 32. The diameter of ring 64 is chosen so that minimal cocking or tilting of the piston axis with respect to the axis of the container 10 would be permitted, while excessive cocking of the piston would be blocked. In normal piston operation, the anti-cocking ring 64 would not contact the container interior wall 58 and, therefore, would not interfere with proper movement of the piston through the container.

Another purpose of the anti-cocking ring 64 and its supporting skirt 62 is to define the lower terminal position of the piston 40 during loading of the fluent material into the chamber 25 in the container. The height of skirt 62 determines the amount of fluent material that can be loaded in the container. Similarly, the initial compression of the propellant in the lower chamber 27 of the container is also in part determined by the volume of that chamber as established by the height of the piston head 42.

One benefit of the design and construction of the piston 40 according to the invention is that it can be produced in a single injection molding of plastic, using a low density polyethylene plastic or any other suitable plastic.

FIG. 4 shows how the piston 40 is particularly adapted for insertion into a container having interior side walls with a narrowed upper end section 32. The diameter of the depending skirt 62 is small enough for that skirt and the slightly deflected anti-cocking ring 64 to slide past the interior of the reduced diameter section 32. Furthermore, the collar 48 is also of sufficiently reduced diameter to pass the narrowed diameter of the upper section 32 of the container.

However, the outwardly flaring flange 50 is too wide at its upper end 54 to pass by the narrowed container wall section 32. As a result, when the flange is moved through the narrowed wall section, it is forced radially inwardly toward the peripheral side wall 44 of the piston head. As noted above, however, the flange 50 is relatively inflexible, so that it does not bend under the force exerted by the interior wall of the container. The collar 48, on the other hand, is relatively more flexible and does bend inwardly to enable the flaring flange 50 to be accommodated past the narrowed container section 32. The back wall of the junction 52 between the collar 48 and the flange 50 comprises the "heel" 66. The height of the collar 48 and the exterior diameter of the piston head periphery at 44 are selected such that with the flange passing in engagement with the interior of the reduced diameter section 32 of the container, the heel 66 does not contact the exterior 44 of the piston head. Were such contact to occur, the frictional engagement might undesirably stretch the collar 48 lengthwise and so deform the piston so as to preclude its effective operation once it is installed in a container.

There has just been described a novel barrier piston for an aerosol container, which piston includes as its main feature an annular, cylindrical collar which supports an outwardly flaring flange above it, and the upper outer corner edge of the flange is the part which sealingly engages the interior wall of the container. The combination of the relatively rigid sealing flange with the relatively more flexible collar gives the piston freedom to slightly cock while still maintaining a secure seal, and it also permits the piston to be inserted through the top of an aerosol container which has a somewhat restricted size entrance opening at the top. The piston according to the invention can be used in a rigid can and the piston itself will deform to maintain its seal as the piston passes any deformities and dents in the side walls of the rigid can. The piston can also be used in a weaker, more flexible walled container, in which case the rigidity of the piston will restore the shape of the weak walls of the container to conform to the shape of the more rigid piston.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A barrier piston for an aerosol dispensing container, comprising:
   a piston head constructed to sealingly separate the aerosol container into two chambers on opposite sides of said piston; said piston head having an annular support therearound;
   an annular cylindrical collar, having a bottom end that is sealingly attached to said piston annular support; said collar extending up from said piston annular support to a top end of said collar; said collar having an inner surface that is spaced from said piston head, such that said collar may flex without engaging said piston head;
   an annular flange sealingly attached to said collar top end and extending up from said collar; said collar being relatively more flexible than said flange; said flange being frusto-conically shaped, flaring outwardly, upwardly from the junction of said flange and said collar at said collar top end to a free end of said flange.

2. The barrier piston of claim 1, further comprising anti-cocking means secured to said piston head for blocking cocking of said piston in a container beyond a predetermined extent of cocking.

3. The barrier piston of claim 2, wherein said anti-cocking means comprises support means depending from said piston head in the direction opposite the direction of extension of said collar and said flange and located around said piston head to inhibit excessive cocking thereof in any direction;

engagement means on said support means of a size for engaging the interior of a container after said piston has cocked to said predetermined extent.

4. The barrier piston of claim 2, wherein said anti-cocking means comprises a skirt depending from said piston head in the direction opposite the direction of extension of said collar and said flange;
a ring on said skirt of a size for engaging the interior of a container after said piston has cocked to said predetermined extent.

5. In combination, an aerosol container and the barrier piston of claim 2, said piston being located in said container and sealingly dividing said container into two chambers on opposite sides of said piston;
said container including interior side walls shaped and of a diameter slightly smaller than the diameter of said flange free end, and said flange being oriented in said container to cause said flange free end to sealingly engage said container side walls.

6. The combination of claim 5, wherein the container has an outlet for dispensing material in said container; one said chamber of said container communicating with said container outlet;
said piston being oriented so that said collar and said flange thereof are upstanding in said container toward said outlet which is the direction toward which said piston moves as material is dispensed from said container outlet.

7. The combination of claim 6, wherein said collar is in the form of an annular cylinder.

8. The combination of claim 7, wherein said free end of said flange has an outer peripheral corner edge portion toward which said flange becomes gradually thinner and more flexible.

9. The combination of claim 7, wherein said piston head is shaped to have an upstanding central portion which extends upwardly of said annular support; said piston head central portion having a peripheral side which is radially spaced a distance inwardly from said collar inner surface and from said flange, whereby said collar may be flexed somewhat toward said piston head central portion peripheral side without said junction between said collar and said flange contacting said central portion peripheral side.

10. The combination of claim 9, wherein said container has an end to which said outlet is applied; said piston is insertable into said container from said end of said container to which said outlet is applied before said outlet is applied to said container.

11. The combination of claim 10, wherein said container includes a narrowed diameter section near said end to which said outlet is applied; said piston collar having a diameter smaller than the diameter of said container narrowed diameter section;
said piston head peripheral side being sized with a diameter sufficiently small that as said flange is being inserted past said container narrowed diameter section and said flange and said collar are flexed radially inwardly, said junction between said collar and said flange remains out of engagement with said piston head peripheral side.

12. The combination of claim 11, wherein said anti-cocking means comprises support means depending from said piston head in the direction opposite the direction of extension of said collar and said flange and located around said piston head to inhibit excessive cocking thereof in any direction;
engagement means on said support means of a size for engaging the interior of a container after said piston has cocked to said predetermined extent.

13. The combination of claim 11, wherein said anti-cocking means comprises a skirt depending from said piston head in the direction opposite the direction of extension of said collar and said flange;
a ring on said skirt of a size for engaging the interior of said container side walls after said piston has cocked to said predetermined extent in said container.

14. The barrier piston of claim 1, wherein said free end of said flange has an outer peripheral corner edge portion toward which said flange becomes gradually thinner and more flexible.

15. The barrier piston of claim 1, wherein said free end of said flange has an outer peripheral corner edge portion toward which said flange becomes gradually thinner and more flexible.

16. The barrier piston of claim 1, wherein said piston head is shaped to have an upstanding central portion which extends upwardly of said annular support; said piston head central portion having a peripheral side which is radially spaced a distance inwardly from said collar inner surface and from said flange, whereby said collar may be flexed somewhat toward said piston head central portion peripheral side without said junction between said collar and said flange contacting said central portion peripheral side.

17. The barrier piston of claim 16, further comprising anti-cocking means secured to said piston head for blocking cocking of said piston in a container beyond a predetermined extent of cocking.

18. The barrier piston of claim 17, wherein said anti-cocking means comprises skirt means depending from said piston head in the direction opposite the direction of extension of said collar and said flange.

19. The barrier piston of claim 18, wherein said free end of said flange has an outer peripheral corner edge portion toward which said flange becomes gradually thinner and more flexible.

* * * * *